Oct. 30, 1945.   D. M. LIGHT   2,388,230
SNUBBER
Filed July 27, 1942   2 Sheets-Sheet 1
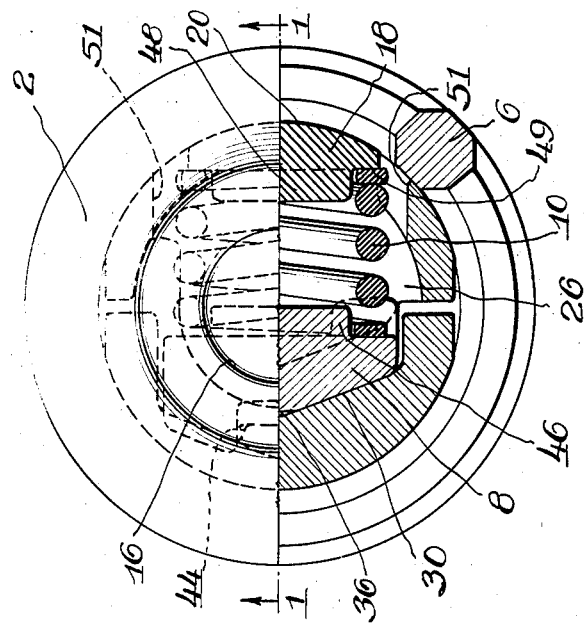
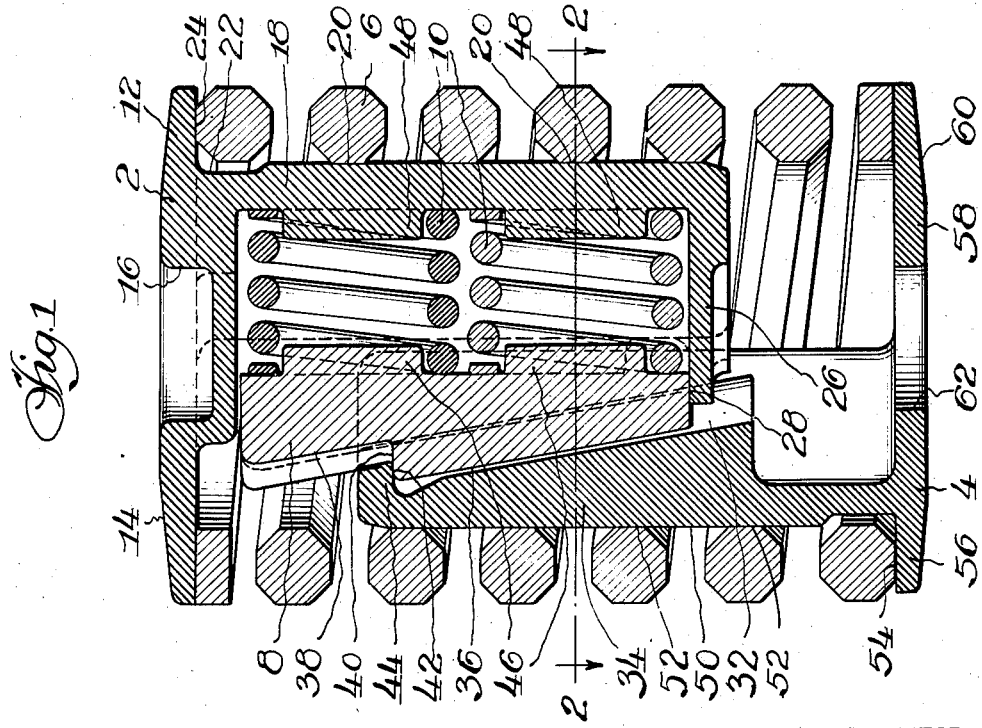
INVENTOR.
David M. Light,
BY
Atty.

Oct. 30, 1945.     D. M. LIGHT     2,388,230
SNUBBER
Filed July 27, 1942     2 Sheets-Sheet 2
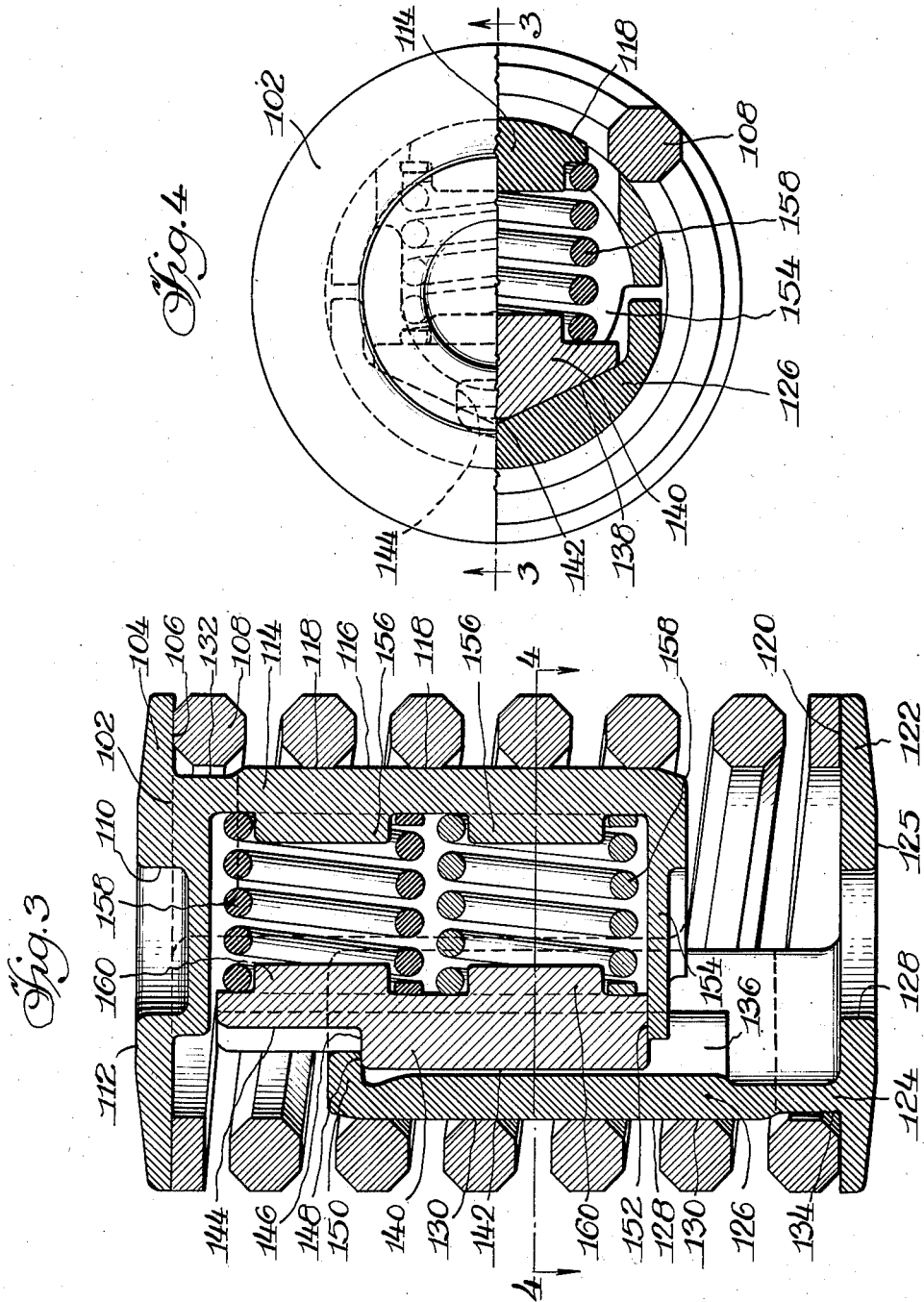
INVENTOR.
David M. Light,
BY Patented Oct. 30, 1945

2,388,230

UNITED STATES PATENT OFFICE 2,388,230

SNUBBER

David M. Light, Chicago, Ill., assignor to American Steel Foundries, Chicago, Ill., a corporation of New Jersey Application July 27, 1942, Serial No. 452,424

31 Claims. (Cl. 267—9)

My invention relates to a novel form of friction absorbing device and particularly to one wherein the friction means may be housed within a compression spring designed to support a load.

The general object of my invention is to devise a novel form of friction absorbing device wherein opposing followers may be partially housed within a spring under compression therebetween and a single friction element may be supported within said device in frictional engagement with one of said followers and urged into engagement therewith by auxiliary springs compressed between said element and the other follower.

A specific object of my invention is to devise a snubber wherein opposed followers may each have frictional engagement with a compression spring extending therebetween and a friction shoe may be so mounted between said followers as to have slidable frictional engagement with one of them and being spaced from the other by auxiliary springs acting to urge said shoe into engagement with its associated follower.

A different object of my invention is to devise such a snubber as that above described wherein the sliding engagement between the shoe and follower may be along a V-shaped friction surface, in certain modifications of which said friction surface may be diagonally arranged and in others of which it may be vertically arranged.

In the drawings, Figure 1 is a sectional view of one modification of my novel form of friction device, the section being taken in a vertical plane along one diameter thereof approximately as indicated by the line 1—1 of Figure 2. Figure 2 is a plan view, half in section, the upper half thereof showing the top plan of my novel friction device and the bottom half thereof being a half section taken approximately in the horizontal plane indicated by the line 2—2 of Figure 1.

Figure 3 is a view comparable to Figure 1 showing a modification of my novel form of snubbing device, the section being taken in a vertical plane along one diameter approximately as indicated by the line 3—3 of Figure 4. Figure 4 is a plan view, half in section, the plan view being taken from the top as seen in Figure 3 and the section in the approximate horizontal plane indicated by the line 4—4 of Figure 3.

Describing my novel snubber in detail and referring first to the modification shown in Figures 1 and 2, it may be noted that it comprises a top follower 2, a bottom follower 4, a compression spring 6 extending between said followers, and a friction element or shoe 8 in frictional engagement with a portion of the follower 4 and urged thereagainst by the transversely arranged auxiliary springs 10, 10.

The follower 2 comprises a disc-like plate portion 12 chamfered about the perimeter thereof as at 14 to permit rocking of said device, said base 12 also having on its outer face a central recess 16 which may serve to position said device with respect to the member against which it may be seated. Projecting from the base 12 may be a semi-cylindrical stem 18, the outer cylindrical face of which may have frictional engagement as at 20, 20 with the respective turns of the compression spring 6, said spring being conveniently formed of such cross-section as to afford a flat surface for engagement at 20 and being illustrated as of hexagonal section. Adjacent the base 12 the stem portion 18 may be relieved somewhat as at 22 in order to afford a satisfactory fit with the first turn of the spring 6 which may seat against the base 12 as at 24. The lower end of the stem 18 may have the horizontal web 26 which may extend beyond the vertical axis of the device to underlie and engage as at 28 the bottom of the friction element or shoe 8.

The said friction shoe 8 may present on one face thereof a diagonally arranged V-shaped friction surface having engagement as at 30 with the complementary surface 32 formed on the stem 34 of the bottom follower 4. At the apex of the V, a slight clearance may be permitted between the friction surface of the shoe and the follower, as best seen at 36, said clearance being provided in order to facilitate adequate seating. Adjacent the upper end thereof the friction shoe 8 is afforded a central vertical slot 38 terminated at its lower end by the shoulder 40 which may have abutment as at 42 with the lug 44 formed at the upper extremity of the stem 34, thus affording an interlock automatically limiting the expansion of said device. On the side opposite its friction surface, the shoe 8 may present a plurality of spaced lugs 46, 46 affording positioning means for the transversely arranged auxiliary springs 10, 10 under compression between said shoe and the stem 18 of the follower 2, said stem 18 also presenting spring positioning lugs 48, 48. Adjacent the seat 49 of the spring 10 against the stem 18, said stem may be cored away as at 51, 51 in order to accommodate said seat and avoid an excessively thin section thereadjacent.

The stem 34 presents an outer cylindrical surface 50 which may have frictional engagement as at 52, 52 with the respective turns of the compression spring 6 and the bottom turn of said spring may seat as at 54 on the annular flange 56 forming a portion of the base 58 which, like the base of the upper follower, may be chamfered about its outer perimeter as at 60 and cored away centrally thereof as at 62.

The upper end of the friction shoe 8 is provided with a surface substantially parallel to the lower surface 28, this surface extending at right angles to the vertical axis of the device. This upper surface comprises a face which frictionally engages the base 12 when the device is being compressed.

The modification illustrated in Figures 3 and 4 is generally similar to that just described except that the friction engaging surface between the shoe and one follower is vertically arranged instead of diagonally. In the modification now under consideration, the top follower 102 comprises the base 104 affording a seat about the perimeter thereof as at 106 for the compression spring 108, the base 104 having the central cavity 110 and affording a seat as at 112 for one end of the device. The follower 102 may present a semi-cylindrical stem portion 114 with a semi-cylindrical surface 116 which may have frictional engagement as at 118, 118 with the several turns of the compression spring 108, the bottom turn of which may seat as at 120 on the base 122 of the bottom follower 124, said base affording a seat as at 125 for the opposite end of the device and being cored out centrally thereof as at 128 for convenient association with positioning means on a supporting member.

The bottom follower 124, like the top follower, may have a stem 126 generally semi-cylindrical in form presenting on the outer surface thereof a friction face 128 for engagement as at 130, 130 with the respective turns of the compression spring 108. The top and bottom followers may be relieved adjacent the bases thereof as at 132 and 134 in order to afford a satisfactory fit with the adjacent turn of the compression spring 108. The stem 126 may present on its inner face a V-shaped friction surface 136 which may have engagement as at 138 with the complementary friction face on the friction member or shoe 140, said shoe and stem having a slight clearance at the apex of the V as at 142 in order to afford a satisfactory fit of the engaging surfaces. The upper end of the shoe 140 may have a central vertical slot 144 defined at its lower end by the shoulder 146 affording abutment as at 148 for the terminal lug 150 at the upper end of the stem 126, said abutment affording an automatic interlock for the parts of the device and limiting the expansion thereof.

The lower end of the shoe 140 may seat as at 152 on a horizontal web 154 at the bottom of the stem 114, the friction shoe 140 thus seating against both followers when the device is at maximum expansion as also described for the previous modification.

The inner face of the stem 114 may present a plurality of lugs 156, 156 serving as positioning means for the transverse auxiliary springs 158, 158, the opposite ends of said springs abutting the friction shoe 140 and being positioned thereagainst by the lugs 160, 160.

It will thus be seen in both modifications of my novel friction absorbing arrangement I have provided a plurality of followers, each presenting a semi-cylindrical stem having frictional engagement with a compression spring abutting bases of the respective followers, and between the stems of said followers I have in both cases afforded a friction shoe and auxiliary compression springs urging said shoe into engagement with the friction surface of the associated follower stem. In the modification of Figure 1, the friction engaging surface between the shoe and the adjacent follower stem is V-shaped and tapered or diagonally arranged, whereas in the modification of Figure 3 the V-shaped friction surface is vertically positioned. In the latter case the friction developed would be substantially constant whereas in the modification of Figure 1 there would be an increment of resistance on the down stroke.

It will be apparent to those skilled in the art that my novel arrangement provides relatively large, long wearing frictional surfaces in a device which is relatively simple with comparatively few parts of generally simple design.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction device, a compression spring having successive turns presenting aligned friction surfaces therealong, top and bottom followers having their bases seated against respective ends of said spring and presenting semi-cylindrical stems within said spring for frictional engagement along said aligned surfaces, a friction element having engagement with one of said stems, and resilient means compressed between said element and the other of said stems, said element having an end seated against one follower and presenting at its opposite end a slot for engagement with a lug on the other of said followers as interlocking means for said device.

2. In a friction device, a compression spring having successive turns presenting aligned friction surfaces therealong, top and bottom followers having their bases seated against respective ends of said spring and presenting semi-cylindrical stems within said spring for frictional engagement along said aligned surfaces, an element having frictional engagement with one of said stems, and resilient means compressed between said element and the other of said stems, said element abutting respective followers adjacent opposite ends thereof to limit the expansion of said device.

3. In a friction device, top and bottom followers each presenting semi-cylindrical friction stems, a compression spring extending between said followers in frictional engagement with said stems, a friction element between said stems in frictional engagement with one of said stems, and auxiliary springs compressed between said element and the other of said stems, said element having abutment adjacent its lower end with the extremity of one stem and adjacent its upper end with the extremity of the other stem when said device is in normal expanded position.

4. In a friction device, a compression spring having successive turns presenting aligned friction surfaces therealong, top and bottom followers having their bases seated against respective ends of said spring and presenting semi-cylindrical stems within said spring for frictional engagement along said aligned surfaces, an element having diagonal face frictional engagement with one of said stems, and resilient means compressed between and reacting against said element and the other of said stems.

5. In a friction device, a compression spring, spaced followers seated against opposite ends thereof and presenting friction stems within said spring, a shoe seated against one of said stems, and resilient means under compression between said shoe and the other of said stems and formed and arranged to afford a straight force path between said shoe and the other of said stems, the seating of said shoe against the associated stem being along a diagonally arranged V-shaped surface with clearance between said stem and said shoe at the apex of said V.

6. In a friction device, a compression spring presenting on respective turns aligned internal friction surfaces, followers abutting respective ends of said spring and presenting portions therewithin for frictional engagement with said surfaces, an element in slidable engagement with one of said portions, and resilient means compressed between said element and the other of said portions, said element having abutment with respective portions to limit the expansion of said device.

7. In a friction device, a compression spring presenting on respective turns aligned internal friction surfaces, followers abutting respective ends of said spring and presenting portions therewithin for frictional engagement with said surfaces, an element in frictional engagement with one of said portions, and resilient means compressed between and abutting said element and the other of said portions.

8. In a snubber, a compression spring, spaced followers seated against respective ends thereof and presenting therewithin semi-cylindrical stems in frictional engagement therewith, a shoe in frictional engagement with one of said stems, an auxiliary spring compressed between and abutting said shoe and the other of said stems, and means on said shoe abutting portions of said stems to retain said device in normal assembled relationship.

9. In a snubber, a compression spring, spaced followers seated against respective ends thereof and presenting therewithin semi-cylindrical stems in frictional engagement therewith, a shoe in frictional engagement with one of said stems, and resilient means under compression between and reacting against said shoe and the other of said stems, the engagement between said shoe and the associated stem being along a V-shaped surface.

10. In a snubber, a compression spring, spaced followers seated against respective ends thereof and presenting therewithin semi-cylindrical stems in frictional engagement therewith, a shoe in frictional engagement with one of said stems, and an auxiliary spring compressed between said shoe and the other of said stems and in abutment with both thereof, the engagement between said shoe and the associated stem being along a V-shaped tapering surface.

11. In a snubber, a compression spring, spaced followers seated against respective ends thereof and presenting therewithin semi-cylindrical stems in frictional engagement therewith, a shoe in frictional engagement with one of said stems, and an auxiliary spring compressed between said shoe and the other of said stems and in abutment with said shoe and said other stem, the engagement between said shoe and the associated stem being along a vertically arranged V-shaped surface.

12. In a friction device, a compression spring with internal faces, spaced followers seated against opposite ends thereof and presenting overlapping stems frictionally engaging said faces, a shoe slidably engaging one of said stems, and resilient means compressed against and between said shoe and the other of said stems, the engaging surface of said shoe with the associated stem being along a diagonally arranged V-shaped surface.

13. In a snubber, a compression spring, followers seated against respective ends thereof and having portions extending therewithin and in engagement therewith, one of said portions presenting a diagonally arranged V-shaped friction surface, a friction shoe in complementary engagement with said surface, and resilient means under compression between said shoe and the other of said portions and formed and arranged to afford a straight force path between said shoe and the other of said portions, said shoe having means abutting respective portions to limit expansion of said device.

14. In a friction device, a compression spring, top and bottom followers having semicylindrical portions extending within said spring in frictional engagement therewith, said top follower having a horizontal bottom web, said bottom follower presenting a friction surface, a friction shoe seated on said web and having a complementary face engaging said surface, and resilient means under compression between said shoe and said top follower.

15. In a snubber, a compression spring, followers seated against respective ends thereof and having portions extending therewithin and in engagement therewith, one of said portions presenting a V-shaped friction surface, a friction shoe in complementary engagement with said surface, resilient means under compression between said shoe and the other of said portions and formed and arranged to afford a straight force path between said shoe and the other of said portions, and stop means on said shoe abutting means on respective followers to retain said parts in normal assembled relationship.

16. In a friction device, top and bottom followers each presenting a semicylindrical stem, a compression spring extending between said followers in frictional engagement with said stems, a friction element between said stems in frictional engagement with one of said stems, and auxiliary springs compressed between and reacting against said element and the other of said stems, said element having an end seated on one of said followers for movement therewith and having stop means adjacent its opposite end engaging the other follower.

17. In a snubber, a compression spring, spaced followers seated against respective ends thereof and presenting therewithin semi-cylindrical stems in frictional engagement therewith, a shoe in frictional engagement with one of said stems, and an auxiliary spring compressed between said shoe and the other of said stems, said shoe being seated on the portion of one of said followers for movement therewith and having stop means engaging the other of said followers to limit expansion of said snubber.

18. In a snubber, a compression spring, top and bottom followers abutting respective ends of said spring and presenting therewithin portions for frictional engagement therewith, a friction shoe having V-shaped frictional engagement with one of said portions, and resilient means compressed between and in abutment with said shoe and the other of said portions.

19. In a snubber, a compression spring, top and bottom followers abutting respective ends of said spring and presenting therewithin portions for frictional engagement therewith, a friction shoe engaging one of said portions along a diagonally arranged friction face, and resilient means compressed between and reacting against said shoe and the other of said portions.

20. In a friction device, a compression spring having inner faces, spaced followers seated against opposite ends thereof and presenting overlapping semi-cylindrical stems in frictional engagement with said faces, a shoe movably engaging one of said stems, and resilient means compressed between and against said shoe and the other of said stems.

21. In a friction device, a compression spring, spaced followers seated against opposite ends thereof and having semi-cylindrical stems in reciprocal relationship therewithin and in frictional engagement therewith, one of said stems supporting a friction shoe in engagement with the other of said stems, and resilient means compressed between and in abutment with said friction shoe and said shoe supporting stem.

22. In a friction device, a compression spring, spaced followers seated against opposite ends thereof and having semicylindrical stems in reciprocal relationship therewithin and in frictional engagement therewith, one of said stems supporting a friction shoe in engagement with the other of said stems for movement therealong, resilient means compressed against and between said friction shoe and said shoe-supporting stem, and stop means on said shoe abutting respective stems to limit expansion of said device.

23. In a friction device, a compression spring having internal faces, spaced followers having V friction stems within said spring for reciprocal movement against said faces, one of said stems having a diagonal V- shaped friction surface, the other of said stems supporting a friction shoe in complementary engagement with said surface, and resilient means compressed between and reacting against said shoe and said last mentioned stem.

24. In a friction device, a compression spring having internal faces, spaced followers having overlapping friction stems within said springs for reciprocal movement along said faces, one of said stems having a diagonal V-shaped friction surface, the other of said stems supporting a friction shoe in complementary engagement with said surface, and resilient means under compression between and in abutment with said shoe and said last mentioned stem.

25. In a friction device, a compression spring having internal faces, spaced followers having overlapping friction stems within said spring for reciprocal movement along said face, one of said stems having a diagonal V-shaped friction surface, the other of said stems supporting a friction shoe in complementary engagement with said surface, resilient means compressed between and reacting against said shoe and said last mentioned stem, and stop means on said shoe abutting respective stems to limit expansion of said device.

26. In a friction device, a coil spring presenting internal friction surfaces, spaced followers abutting respective ends of said spring and presenting friction stems for reciprocal frictional movement along said surfaces, one of said stems presenting a vertical friction face and the other of said stems supporting a friction shoe engaging said face, and resilient means compressed between and in abutment with said shoe and said last mentioned stem.

27. In a friction device, a coil spring presenting internal friction surfaces, spaced followers abutting respective ends of said spring and presenting friction stems for reciprocal frictional movement along said surfaces, one of said stems presenting a V-shaped vertical friction face and the other of said stems supporting a friction shoe engaging said face, and resilient means compressed between and in abutment with said shoe and said last mentioned stem.

28. In a friction device, top and bottom followers, a compression spring therebetween presenting aligned friction surfaces therewithin, each of said followers having a stem portion within said spring in frictional engagement with said surfaces, a friction shoe engaging said portions, resilient means compressed between said shoe and one of said followers, and interlocking means for said device on said shoe and one of said followers.

29. In a snubber, a compression spring presenting aligned friction surfaces on respective turns thereof, top and bottom followers seated against opposite ends of said spring with stem portions therewithin in frictional engagement with said surfaces, a wedge shoe having flat face engagement with one of said stem portions and V-shaped engagement with the other thereof, and resilient means compressed between one of said stem portions and said shoe.

30. In a friction device, top and bottom followers, a compression spring therebetween presenting aligned friction surfaces therewithin, each of said followers having a stem portion within said spring in frictional engagement with said surfaces, a friction shoe having faces engaging complementary surfaces on respective portions and resilient means urging said shoe into engagement therewith, one of said last-mentioned surfaces being positioned at one side of the vertical axis of said device and the other of said surfaces extending through said axis.

31. In a friction device, top and bottom followers, a compression spring therebetween presenting aligned friction surfaces therewithin, each of said followers having a stem portion in overlapping relationship within said spring in frictional engagement with said surfaces, a shoe in frictional engagement with said portions and means on said shoe engaging means on one of said followers to limit the expansion of said device.

DAVID M. LIGHT.